(12) United States Patent
Schulte et al.

(10) Patent No.: US 11,339,815 B2
(45) Date of Patent: May 24, 2022

(54) MECHANICAL CONNECTION FOR PANELS

(71) Applicant: Guido Schulte, Rüthen-Meiste (DE)

(72) Inventors: Guido Schulte, Rüthen-Meiste (DE); Franz-Josef Eschlbeck, Prien am Chiemsee (DE)

( * ) Notice: Subject to any disclaimer, the term of this patent is extended or adjusted under 35 U.S.C. 154(b) by 916 days.

(21) Appl. No.: 16/061,822

(22) PCT Filed: Dec. 14, 2016

(86) PCT No.: PCT/DE2016/100586
§ 371 (c)(1),
(2) Date: Jun. 13, 2018

(87) PCT Pub. No.: WO2017/101910
PCT Pub. Date: Jun. 22, 2017

(65) Prior Publication Data
US 2020/0263714 A1   Aug. 20, 2020

(30) Foreign Application Priority Data
Dec. 14, 2015   (DE) ..................... 10 2015 121 761.9

(51) Int. Cl.
*F16B 5/00*       (2006.01)
*E04F 15/02*      (2006.01)

(52) U.S. Cl.
CPC ...... *F16B 5/0032* (2013.01); *E04F 15/02038* (2013.01); *E04F 2201/0146* (2013.01); *E04F 2201/0552* (2013.01)

(58) Field of Classification Search
CPC .............. F16B 5/0032; E04F 15/02038; E04F 2201/013; E04F 2201/0146; E04F 2201/0552
See application file for complete search history.

(56) References Cited

U.S. PATENT DOCUMENTS

| 7,726,088 B2* | 6/2010 | Muehlebach | ........... E04F 15/02 52/582.1 |
| 8,220,217 B2* | 7/2012 | Muehlebach | ........... E04F 15/02 52/582.1 |

(Continued)

FOREIGN PATENT DOCUMENTS

| DE | 102009022483 A1 | 12/2010 |
| DE | 102009041297 A1 | 3/2011 |

(Continued)

OTHER PUBLICATIONS

International Search Report issued by the European Patent Office in International Application PCT/DE2016/100586.

(Continued)

*Primary Examiner* — Matthew R McMahon
(74) *Attorney, Agent, or Firm* — Henry M. Feiereisen LLC (57) ABSTRACT

A mechanical connection connects panels edge sides to one another. Adjacent first and second panels can be locked in the horizontal and vertical direction by a substantially perpendicular joining movement. For vertical locking, a locking edge is arranged on the first panel and a locking element that can be displaced relative to the panels is arranged on the second panel. The locking element can be displaced behind the locking edge by a pivoting movement. A locking projection for displacing behind the locking edge and an arcuate guide arm guided in a guide groove of the second panel are designed to be partially withdrawn from the guide groove with a rotary or pivoting movement of the locking element by a leg. The leg projects from the guide groove of the locking element coming into contact with the first panel when being set down in a region below the locking edge.

9 Claims, 10 Drawing Sheets

(56) References Cited

U.S. PATENT DOCUMENTS

| | | | |
|---|---|---|---|
| 8,869,485 B2* | 10/2014 | Pervan | E04F 15/02038 |
| | | | 52/582.1 |
| 8,966,852 B2 | 3/2015 | Cappelle | |
| 2009/0019806 A1 | 1/2009 | Muehlebach | |
| 2012/0124932 A1 | 5/2012 | Schulte et al. | |
| 2014/0186104 A1* | 7/2014 | Hamberger | F16B 5/0016 |
| | | | 403/292 |

FOREIGN PATENT DOCUMENTS

| | | | | |
|---|---|---|---|---|
| DE | 102012105793 A1 | | 1/2013 | |
| DE | 102013112550 A1 * | | 2/2015 | E04F 15/04 |
| EP | 2674546 A1 | | 12/2013 | |

OTHER PUBLICATIONS

German Search Report dated Jul. 15, 2016 with respect to counterpart German patent application 10 2015 121 761.9.

Translation of German Search Report dated Jul. 15, 2016 with respect to counterpart German patent application 10 2015 121 761.9.

* cited by examiner

MECHANICAL CONNECTION FOR PANELS

CROSS-REFERENCES TO RELATED APPLICATIONS

This application is the U.S. National Stage of International Application No. PCT/DE2016/100586, filed Dec. 14, 2016, which designated the United States and has been published as International Publication No. WO 2017/101910 and which claims the priority of German Patent Application, Serial No. 10 2015 121 761.9, filed Dec. 14, 2015, pursuant to 35 U.S.C. 119(a)-(d).

BACKGROUND OF THE INVENTION

The invention relates to mechanical connections for panels that can be connected to each other to form a covering.

Wall, ceiling and floor coverings, such as prefabricated parquet, real wood floors or laminate floors, consist of several rows of panels having a predominantly rectangular configuration. Conventionally, the panels have continuous grooves on one longitudinal side and on one head side and continuous springs on the respective opposite longitudinal side or head side, which are adapted to the grooves in a form-fitting manner. The panels are laid by connecting tongue and groove, wherein the panels of two adjacent rows are offset from one another.

It is known to form mechanical locking means on the grooves and springs, which latchingly engage with one another in adjacent panels of a floor covering. This is intended to prevent a joint formation due to expansion or shrinkage processes. Locking elements that match the tongue and groove of the panels are formed as indentations, recesses or projections to hold the panels in the assembled position without the need for an adhesive.

In general, the panels are rotated or clicked into each other along their long sides and then moved laterally, so that the locking strips engage at the head sides.

Resilient locking elements for vertical locking of adjacent panels are known, which protrude from the edge side, which must be pushed back behind the edge side when laying the panels and which must be displaced again beyond the edge side in the connected position to connect the panels. The two-directional movement is complex.

It is the object of the invention to disclose a mechanical connection for panels, which are in particular connectable to a floor covering, wherein the locking mechanism does not require to first pushing back a locking element before it reaches the locking position.

SUMMARY OF THE INVENTION

This object is attained by a connection for panels at their edge sides to be joined together, wherein adjacent first and second panels are lockable in the horizontal and vertical directions by a substantially vertical joining movement, wherein for vertical locking a locking edge (8) is arranged on the first panel, and a locking element which is displaceable with respect to the panels is arranged on the second panel, wherein the locking edge is located below a support strip which is formed as a projection on an edge side of the first panel, and wherein the second panel rests in the locking position on the support strip between the top side of the first panel and the locking strip, wherein the locking element can be displaced behind the locking edge by a pivoting movement, wherein the locking element has a locking projection for displacement behind the locking edge and has an arcuate guide arm, which is guided in a guide groove of the second panel and is constructed to be partially pulled out of the guide groove with a rotary or pivotal movement of the locking element in that a leg of the locking element protruding from the guide groove comes into contact during placement with the first panel in a region below the locking edge.

Advantageous embodiments of the invention are the subject of the dependent claims.

The mechanical connection is provided for edge sides with panels to be joined. Adjacent first and second panels can be locked by a substantially vertical joining movement in the horizontal and vertical directions. Horizontal direction means here parallel to the laying plane. Vertical means here perpendicular to the laying plane. It is assumed in the following and with reference to terms such as top, bottom, horizontal and vertical, that the panels are floor panels, which are correspondingly laid horizontally and placed downward substantially vertically. Accordingly, the vertical lock operates in the vertical direction and the horizontal lock in the horizontal direction.

For vertical locking, a locking edge is formed on the first panel to be laid first. A locking element that is displaceable relative to both panels is arranged at the second panel which is to be laid subsequently and connected to the first panel. The locking element is displaceable behind, or as viewed from above below, the locking edge of the first panel by a pivoting movement. For this purpose, the locking element has a locking projection for displacement behind/under the locking edge. The locking element furthermore has an in particular arcuate guide arm which is guided on a guide groove of the first panel. The guide arm is designed to be partially pulled out of the guide groove with a rotary or pivoting movement of the locking element, in that a leg of the locking element protruding from the guide groove comes into contact during placement with the first panel in a region below the locking edge.

The contact of the leg with the first panel causes the leg to move away from the first panel, with an upward force being exerted on the locking element and in particular the guide arm. The guide arm and the guide groove are formed such that the locking element is pressed quasi upward and can be partially pulled out of the guide groove. The upward movement, i.e. away from the bottom of the panels, is a guided movement. The direction of movement is at least partially defined by the guide groove and the guide arm. The movement takes place along a curve or along several circular arc sections, in particular along a single circular arc section. The transition between adjacent curve sections may be smooth and without jumps, so that the curve sections join one another tangentially. However, break points in the curve in the transition from adjacent curve sections are also conceivable. Straight sections can alternate with curve sections. Even a sequence of shorter but straight sections that interconnect like a chain is possible for creating a curved profile.

The leg which is supported on the first panel causes the guide arm to be pulled out of the guide groove and, due to the mutual guidance, to execute a rotary or pivoting movement. The term rotary movement refers to circular arc movements. The term pivotal movement refers to non-circular arc movements. The movements may also be combined.

The mechanical connection according to the invention is based on the principle that the locking element is displaced for locking purposes only in a single direction. The locking element is held in an initial position within the guide groove and can be rotated or pivoted into the locking position. The pivoting is according to the invention not bidirectional, i.e. first into the guide groove and then again out of the guide groove, but unidirectional, i.e. only out of the guide groove under the influence of the leg, which is pushed upwards by the first panel.

The panels have a horizontal connection and a vertical connection at their edge sides to be joined together. The horizontal connection can be produced in that the first panel to be laid engages below the second panel to be laid. For this purpose, grooves and projections, which are open toward the top and toward the bottom, are provided on the panels, which can engage with each other for horizontal locking. The horizontal locking can also be effected by a separate locking element arranged at the bottom side of the panels, for example in the form of a separate clip.

The vertical locking is effected by said locking element, which can be displaced behind/below the locking edge of the other panel. The locking element is arranged only on the second panel, which is laid subsequent to and laterally adjacent to the first panel.

The leg is preferably rigidly connected to the arcuate guide arm. The rigid connection makes it possible to introduce the forces originating from the leg directly into the guide arm, so that the guide arm is pulled out of the guide groove with the force with which the second panel is laid down. In this way, the locking can be influenced by way of the pressure exerted on the second panel. A substantially rigid connection also reduces the number of degrees of freedom of the locking element and improves the guidance between the guide groove and guide arm. The term "rigid" is to be understood functionally, wherein the function of pulling the guide arm close and the function of guiding the locking element into the locking position must be ensured. The rigid connection refers to the respective material properties of the locking element in the transition region from the guide arm to the leg. Preferably, the locking element is made as one piece of the same material, so that not only the connection is rigidly configured, but the material itself is substantially rigid in order to fulfill the function. The locking element is preferably made of plastic. Preferably, the locking element has over its entire length a constant cross-section, so that it can be produced very economically by extrusion.

The locking elements can also be produced by material-removing processes, in particular by machining. As a result, very high accuracies can be achieved, whereby the accuracy of the fit of the locking element can be improved and the precision of the mechanical connection can be further increased. Combined manufacturing processes, such as an at least partial machining of a previously extruded component combine the cost-effective production of extrusion with the precision of the machining.

The locking elements may be composed of metallic materials, in particular of aluminum alloys or iron alloys, in particular of steel. The locking elements may be composed of wood or wood-based materials, i.e. made of composite materials. Other composite materials such as fiber-reinforced plastics can be used. Preferably, the locking element may be composed exclusively of plastic. The locking spring may be coated in sections or may have surface areas with different roughness, in order to reduce the friction in the guide groove.

If a panel is not laid down vertically, but by a pivoting movement, which is also referred to as angling, the locking element may become twisted, because the leg is not uniformly loaded. To counteract this, a locking element can be interrupted several times or several shorter locking elements may also be inserted in a side of a panel. Therefore, the connection according to the invention is suitable for panels that are joined together in a substantially perpendicular manner as well as for panels which are joined by angling. When the second panel is pivoted back upwardly, the mechanical connection can be released without requiring tools. It is also possible to displace the locking element parallel to the longitudinal side, i.e. to push it out of the guide groove, in order to unlock the panels.

The guidance of the guide arm is determined not only by the preferably arcuate contour of the guide arm, but also by the contour of the guide groove. Preferably, the contour of the guide groove has at least in sections an arcuate curvature. In particular, the lower groove flank of the guide groove should be curved at least in segments, in particular concave. When the guide arm is pulled out of the guide groove with the arcuate curvature, it bears against the guide groove in the region of the mouth of the upper groove flank. This is due to the upward pressure of the leg. At the same time, the guide arm is supported by its bottom side on the lower groove flank. The lower groove flank is, when in operative engagement with the lower side of the guide arm, preferably configured so as to be in contact not only along a line, but over an area. In the region in which the guide arm makes contact in the locking position, the lower groove flank can be adapted to the shape of the locking arm. The arcuate curvature of the lower groove flank therefore preferably corresponds to the arcuate curvature of the bottom side of the leg, at least in the areas in which the two components come into permanent contact with each other. This region of the guide groove and/or of the bottom side of the guide arm is preferably flat. Conversely, the contour of the upper groove flank plays only a minor role, except for the design and arrangement of the mouth region. The mouth should be rounded in the area of the upper groove flank so as to enable the locking body to easily slide on the groove flank.

The guide groove may be configured so as to clampingly hold the guide arm in the initial position. For this purpose, the rear end of the guide groove may be slightly narrower and/or the guide arm may be slightly thicker in this area. The groove width can increase accordingly in the center region. As a result, the guide arm is securely held in the initial position. The locking element is thereby held captive on the panel. During the displacement of the locking element, the rear end of the guide arm is thus initially released and the guide arm can now be moved into the locking position with significantly reduced friction due to the larger groove width. In particular, the upper groove flank of the guide groove may be substantially straight, while the lower groove flank of the guide groove has a concave curvature. Preferably, the lower groove flank opens horizontally and rises from the bottom of the groove continuously towards the top. The bottom of the groove is preferably closer to the top of the panel than the mouth of the upper groove flank. As a result, a locking member having a guide arm which almost or completely reaches the bottom of the groove cannot be pulled out of the guide groove horizontally.

In an advantageous embodiment of the invention, the leg may come into positive engagement with the first panel so as to prevent the leg from unimpededly sliding back into the starting position and thus an unlocking of the mechanical connection. For this purpose, the leg can in the locking position engage in a latching recess on the first panel. The latching recess is preferably a groove or a notch into which the leg snaps. A matching projection for engaging in the locking recess may be formed at the free end of the leg.

In a further preferred embodiment of the invention, a locking surface that is inclined with respect to the laying plane is arranged on the first panel adjacent to the locking edge for engagement with the locking projection. This locking surface serves to transmit via the locking element into the second panel forces acting perpendicular to the first panel. Preferably, the locking element bears flat against this locking surface. The forces originating from the first panel or the latching surface are transferred via the guide arm into the second panel. This vertical locking prevents a height offset between the panels under a one-sided load. The locking element creates on the second panel a pressure in the guide groove, which presses the second panel down against the first panel. The panels become vertically aligned with each other, i.e. perpendicular to the laying plane, so that no height offset between the panels is created. The fit is secured. A free end of the guide arm is thus adapted to be pressed in the locking position with its bottom side remote from a groove mouth of the guide groove against the lower groove flank of the guide groove, thereby locking the panels vertically against each other. Due to the distance between the bottom side contact region of the guide arm and the groove mouth, greater forces can be exerted on the lower groove wall as in a line contact in the region of the mouth.

The locking elements according to the invention can also be secured in the guide groove in that a certain area of the locking elements has a cross-section that deviates from the other areas. For example, the locking elements may have at one and preferably at both ends a projection pointing to the upper and/or lower groove flank of the guide groove, so that the guide arm has—over its entire length or only along sections—a slightly larger width and hence in this area larger friction with the guide groove arises than in other areas. Thereby, the locking element can be held captive inside the guide groove, without at the same time increasing the friction of the guide arm inside the guide groove over its entire length. Such a projection can already be created by cutting a locking element to length. For example, when cutting plastic to length, a lug in the cutting direction, which results from entrainment of the material along a cutting tool, may be sufficient to secure the locking element in the guide groove. Such projections may be formed with suitable cutting means at both ends, so that both ends of such guide element are secured against falling out. The advantage with such protrusions is that they can be produced simultaneously with the cutting to length, without requiring a separate processing step.

Alternatively, it is possible to intentionally deform a longitudinal segment of the locking element transversely to the longitudinal extent of the locking element, e.g. by a corrugation. As a result, the guide arm sits in the deformed area slightly firmer in the guide groove than in other areas. The deformation is sufficient if the locking element is held captive. Such deformed areas are preferably located at the ends of each locking element. Such deformations on the locking element can also be created by upsetting the ends of the locking elements, which thicker regions are produced at the ends, which may lead to a tighter fit of the end portions of the locking element in a guide groove.

Because embossing or upsetting of the end portions could also deform the leg, it is possible for ensuring precise locking to remove the leg in the region of the deformed ends that are provided for the positional orientation of the locking element. The deformed ends, which are formed without legs, can be very short and limited to a few millimeters, in particular to less than 10 mm. As a result, only a fraction of the length of the locking element is used for positional orientation of the locking element in the guide groove, while the major portion participates in the vertical locking.

According to another embodiment of the invention, the edge sides of the panel that are not provided with said lock member are provided with a profile for vertical locking, which includes a stationary spring tongue, which can be brought into engagement with a groove below the locking edge. This embodiment takes into account the case that a panel is rotated by 90° or 180°. Also in this case, a mechanical connection in the vertical direction should be feasible. For this purpose, a groove is formed below the locking edge in adaptation to stationary spring tongues of the other edge sides.

According to another embodiment of the invention, the second panel rests in the locking position on a support strip between the top side of the first panel and the locking strip, wherein the second panel is held by the spring tongue on the first panel for vertical locking either by the pressure of the locking element from below against the first panel or for a stationary spring. The support strip is thus part of the vertical locking, wherein this part of the vertical locking prevents the second panel from being lowered too much relative to the first panel. The support strip preferably runs parallel to the top side of the panels. Other orientations are possible as long as a support for the second panel is available on the first panel.

The panels may be rectangular or square. Typically, one side is formed with a locking element and the opposite side with a mating locking edge. It is possible to provide adjacent corner-to corner sides of such panels with these locking elements. In this case, the two other sides are provided with the matching locking edges. This should allow greater flexibility when laying square panels.

The inventive idea is applicable to all floor-, wall- and ceiling-systems. In addition to panels without coatings, in particular top coverings on a carrier can be provided with the mechanical connection. The carrier may be in particular a wood panel, such as an MDF, HDF or particle board. The mechanical connection is suitable for real wood coverings, laminate, carriers with painted surfaces as top covering, linoleum, cork on support panels, etc. The cover layer may in particular consist of a decorative paper with overlay, which determines the appearance of the elements.

A floor covering can thus be a prefabricated parquet floor, a real wood floor or a laminate floor. Likewise, elements of solid material, such as wood flooring, wooden elements, cast or injection-molded panels made of plastic, in particular PVC, vinyl or molded parts or plasterboard. The locking elements can also be used with panels having a lesser thickness of 4 to 8 mm. The panels may be, inter alia, panels for PVC flooring, e.g. carrier panels with top-side PVC-based coverings. The panels may also be plastic panels or cement-based panels. The individual panels may be fiber-reinforced. WPC/BPC (Wood-Plastic Compound/Bamboo-Plastic-Compound) materials are as suitable as panels of wood-powder-proportions (mixture of wood fibers, pigments and binders).

The covering according to the invention allows—with corresponding locking grooves—snap connections which can be made both by swiveling (fold down) and by vertical placement from above. The covering according to the invention is suitable for rectangular and square panels as well as for design layouts where cross joints are formed. This results in a much greater design variety for this type of so-called snap panels. The invention is not limited to a rectangular of the panels and in particular not to the fact that the panels of two adjacent rows are arranged offset from one another.

Advantageously, the locking element according to the invention does not protrude beyond the edge side of the panel in the unlocked state and therefore does not come into contact with the panel laid down first above the locking edge to be engaged from behind. The spring is protected, may be held in the initial position clamped and/or with adhesive substances, with the adhesion effect being released upon locking. The locking elements can be used for panels having thicknesses greater than 4 mm and in particular for squares.

BRIEF DESCRIPTION OF THE DRAWING

The invention will now be explained in more detail with reference to exemplary embodiments illustrated schematically in the drawings, which show in:

FIG. 6a a vertical section through the edge region of two mutually engaging panels according to FIG. 5a;

FIG. 6b FIG. 4g in an enlarged view;

FIG. 7b FIG. 3g in an enlarged view;

DETAILED DESCRIPTION OF PREFERRED EMBODIMENTS

Figure 1:
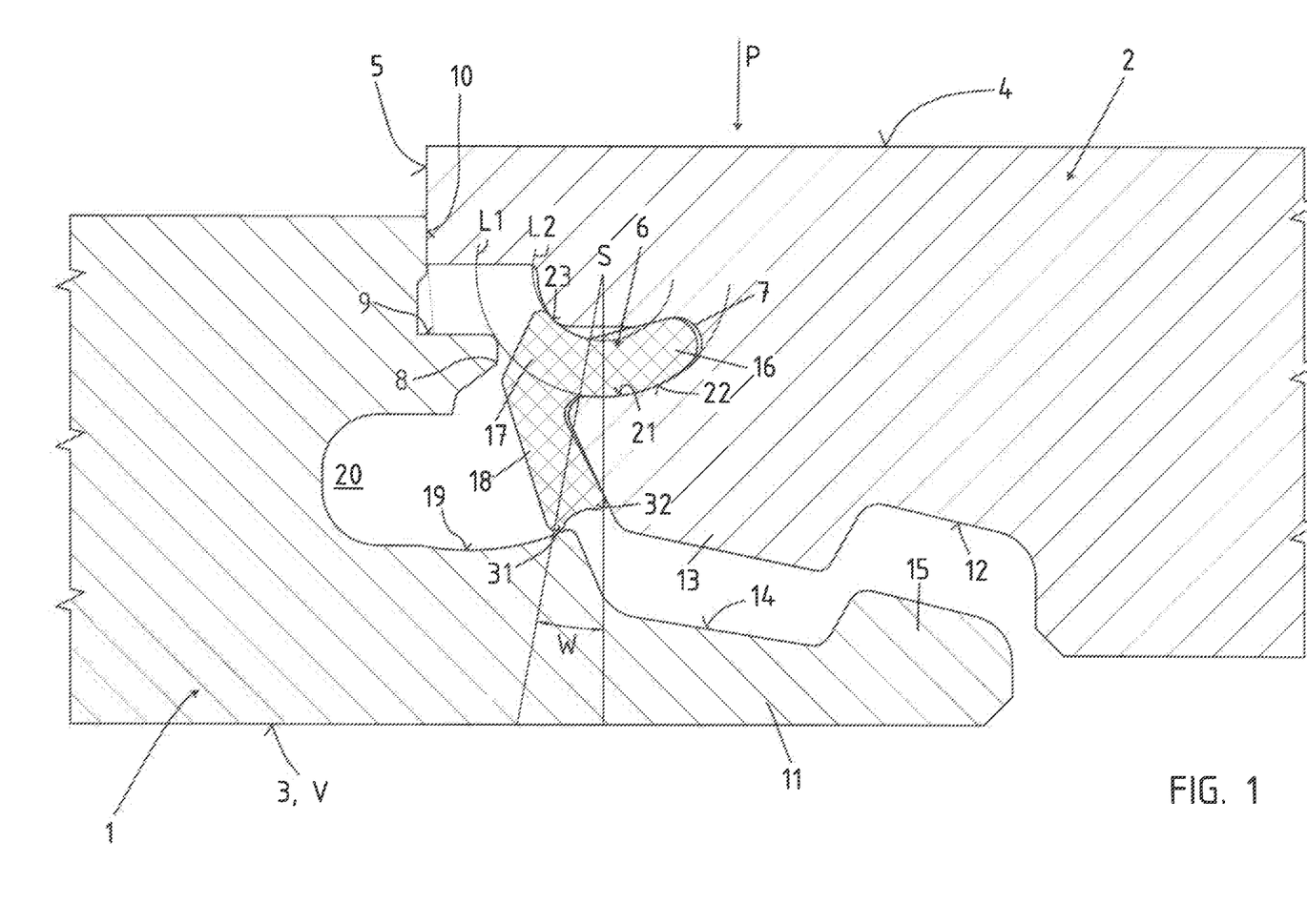
FIG. 1 a vertical section through the edge region of two mutually engaging panels according to a first embodiment.

FIG. 1 shows the cross section through the connecting region of two panels 1, 2. The panels 1, 2 are configured so that they can be assembled into a covering, in particular a floor covering. The panels 1, 2 have a bottom side 3 facing the subsurface and a top side 4 corresponding to the visible side. The bottom side 3 and the top side 4 are parallel to a laying plane V.

The second panel 2 has on the side facing the first panel 1 a locking element 6 in a guide groove 7. The locking element 6 is adapted to engage behind a locking edge 8 on the first panel 1 or to engage under the locking edge 8 as viewed from above. The locking edge 8 is located below a support strip 9, which is formed as a projection on the side 10 of the first panel 1. The support strip 9 extends in this embodiment on the top side parallel to the laying plane V.

Other orientations of the top of the support strip 9 are possible. The top can e.g. extend at an acute angle with respect to the laying plane V. A corresponding recess is formed on the edge side 5 of the second panel 2, so that the second panel 2 is supported near its top side 4 on the first panel 1 perpendicular to the laying plane V.

The first panel 1 has a locking strip 11. The locking strip 11 of the first panel 1 projects farthest from the side 10 of the first panel 1. The second panel 2 has a downwardly open coupling channel 12 and an adjoining downwardly oriented coupling bead 13. The second panel 2 is arranged opposite the first panel 1 such that when lowered in the direction of the arrow P, the coupling bead 13 of the second panel 2 engages with an upwardly open coupling channel 14 of the locking strip 11 and the coupling channel 12 of the second panel 2 engages with a coupling bead 15 of the locking strip 11. This area of the panels 1, 2 serves to horizontally connect the panels 1, 2.

Placement in the direction of the arrow P can be effected in that the top side 4 of the second panel 2 is displaced parallel to the laying plane V. Alternatively, the second panel 2 can be angled with respect to the first panel 1 by pivoting (fold down) about another edge side.

The coupling bead 15 on the locking strip 11 of the first panel 1 and the downwardly projecting coupling bead 13 on the second panel 2 each have an inclined top side or bottom side, so that the coupling bead 13 of the second panel 2 slides on the coupling bead 15 of the initially laid first panel 1 even when the panels 1, 2 are pushed together in the direction of the laying plane V, i.e. when pushed together horizontally. In this case, the second panel 2 is raised until the two panels 1, 2 are guided over the highest point of the coupling bead 15 of the locking strip 11. The second panel 2 then slips automatically into the upwardly open coupling channel 14 on the locking strip 11. The panels 1, 2 can therefore be connected to one another not only by vertical placement or angling, but also by pushing them into one another horizontally in the direction of the laying plane V.

An essential part of the connection between the two panels 1, 2 is the locking element 6 and the cooperation of the profiles in the region of the edge sides 5, 10 of the panels 1, 2. The locking element 6 has a guide arm 16. The guide arm 16 is that part which is arranged in the guide groove 7 and holds the locking element 6 on the second panel 2. The locking element 6 has a locking projection 17 which projects out of the guide groove 7. The locking projection 17 is the region in front of the guide arm 16, which is located outside the guide groove 7.

Figure 5A:
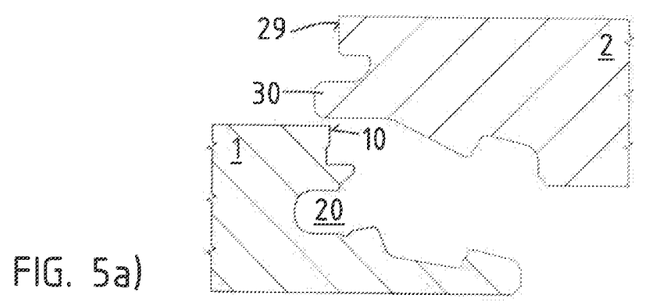
FIG. 5a a vertical section through the edge region of two panels to be joined according to a third embodiment.

In the sectional view, the locking element 6 has a substantially L-shaped or Y-shaped cross-section, because a leg 18 is connected to the locking projection 17 downwardly in the image plane. The leg 18 therefore does not project beyond the edge side 5 of the second panel 2. It extends in the starting position in the direction of the coupling bead 13 and bears against the second panel 2. The leg 18 is intended to pivot the locking element 6 and contacts a guide surface 19 located below the locking edge 8 on the first panel 1, when the second panel 2 is lowered in the direction of the arrow P. The guide surface 19 in this embodiment has a concave curvature. A groove 20, which is open to the side edge 10 and serves to receive a stationary spring tongue, is connected to the guide surface 19, as shown in FIG. 5a. The guide arm 16 is connected flexurally rigidly, i.e. essentially rigidly, to a leg 18.

Two support strips 31, 32 are arranged at the free end of the leg 18, which are intended to come into contact with the guide surface 19. They come, during operative engagement with the guide surface 19, in line contact with the guide surface 19, thereby reducing the friction compared to an area contact.

The locking element 16 is guided in the guide groove 7. For this purpose, the lower groove flank 21 of the guide groove 7 has a concave curvature. In this particular embodiment, the guide groove 7 is shaped as a circular arc, as seen from the line L1. The line L1 describes a circle about a pivot point S, which is located above the guide groove 7. A line L2 describes a smaller radius, also about the pivot point S. It can be seen that the guide arm has a bottom 22 with a convex curvature, wherein the curvature of the line L1 corresponds to the concave curvature of the lower groove flank 21 of the guide groove 7.

On the other hand, the guide arm 16 bears in the region of the mouth of the guide groove 7 on the top side against the upper groove flank 23, wherein the mouth region is located on the line L2. Accordingly, the locking element 6 is displaced along the two circular arcs (lines L1 and L2). The angle W1 indicates how far at least the locking element needs to be pivoted until both support strips 31, 32 come into contact with the guide surface 19.

Figure 3A:
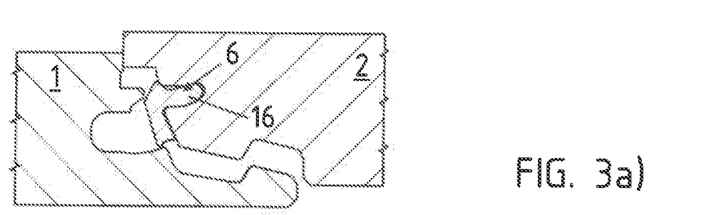
FIG. 3a to g a vertical section through the edge region of two panels to be joined together according to another embodiment during joining.
Figure 3B:
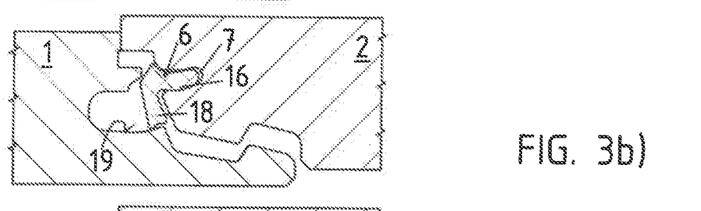
Figure 3C:
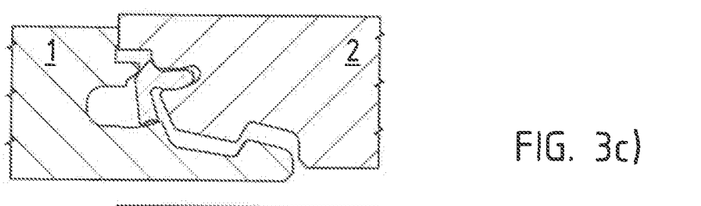
Figure 3D:
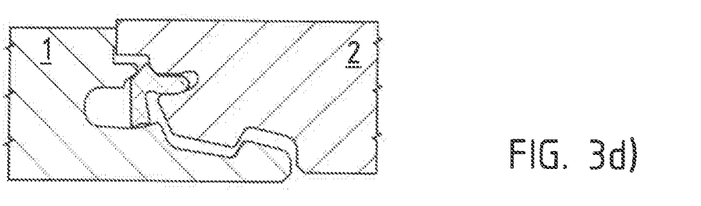
Figure 3E:
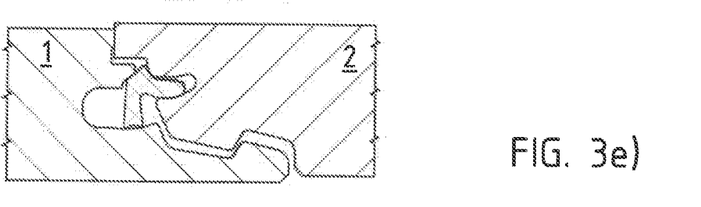
Figures 3F, 3G:
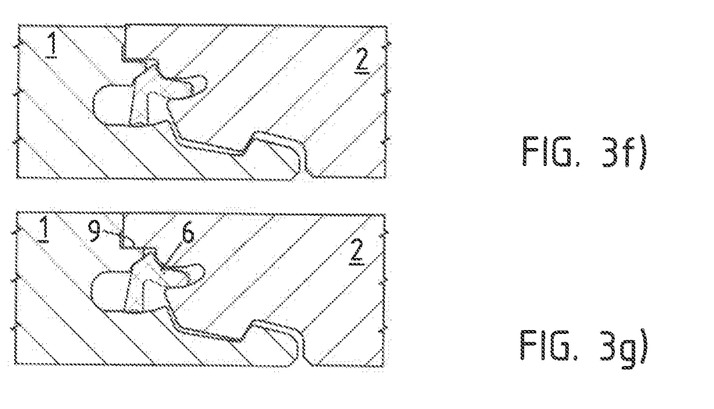
Figure 4A:
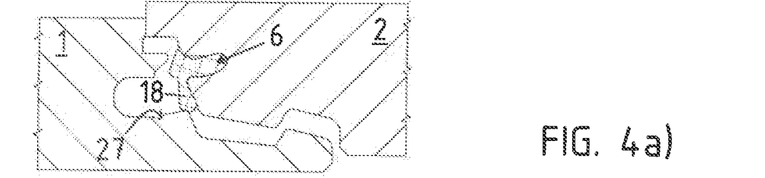
FIG. 4a to g a vertical section through the edge region of two panels to be joined according to the first embodiment.
Figure 4B:
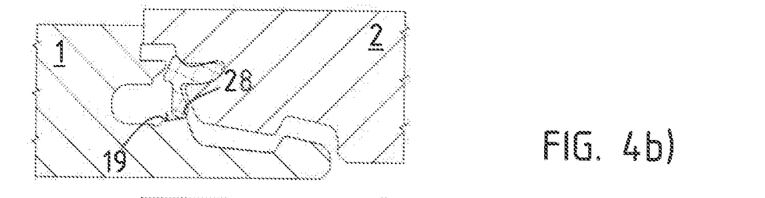
Figure 4C:
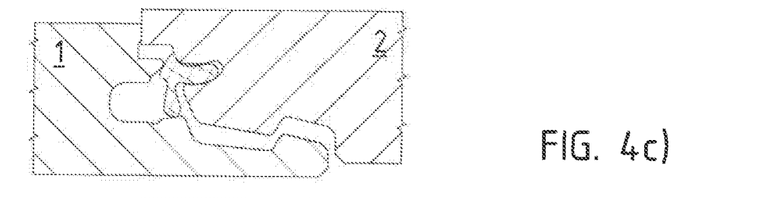
Figure 4D:
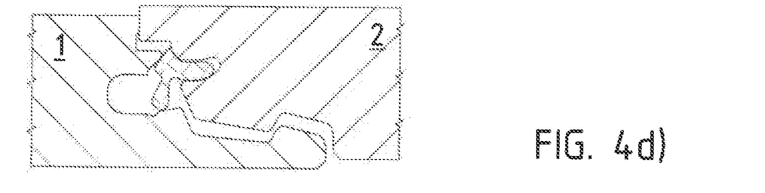
Figure 4E:
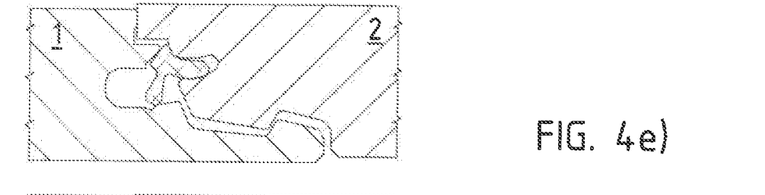
Figure 4F:
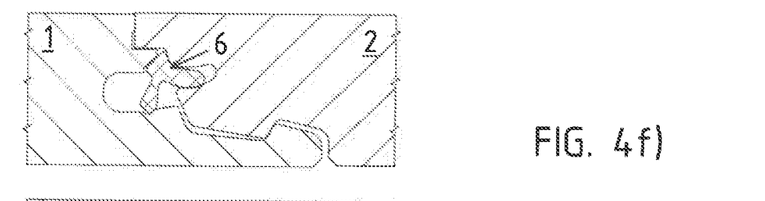
Figure 4G:
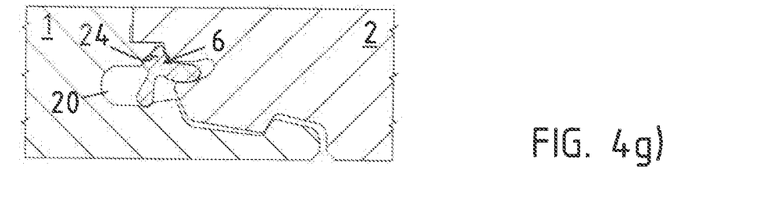

FIGS. 3a to g show the intended sequence of movements. In FIG. 3a, the two panels 1, 2 are shown shortly before the locking element 6 comes into contact with the first panel 1. Upon contact with the guide surface 19, the leg 18 of the locking element 6 pushes the locking element 6 upwards, so that the guide arm 16 is pulled out of the guide groove 7. FIGS. 3c to 3f show the further course of this pivoting movement until finally the locking position is reached in FIG. 3g. The two panels 1, 2 are located at the same height, because the second panel 2 rests on the support strip 9 of the first panel 1. As a result, the support strip 9 is clamped between the locking element 6 and the second panel 2 resting on the top side. At the same time, the locking element 6 prevents the second panel 2 from being lifted away vertically from the first panel 1.

Figure 2:
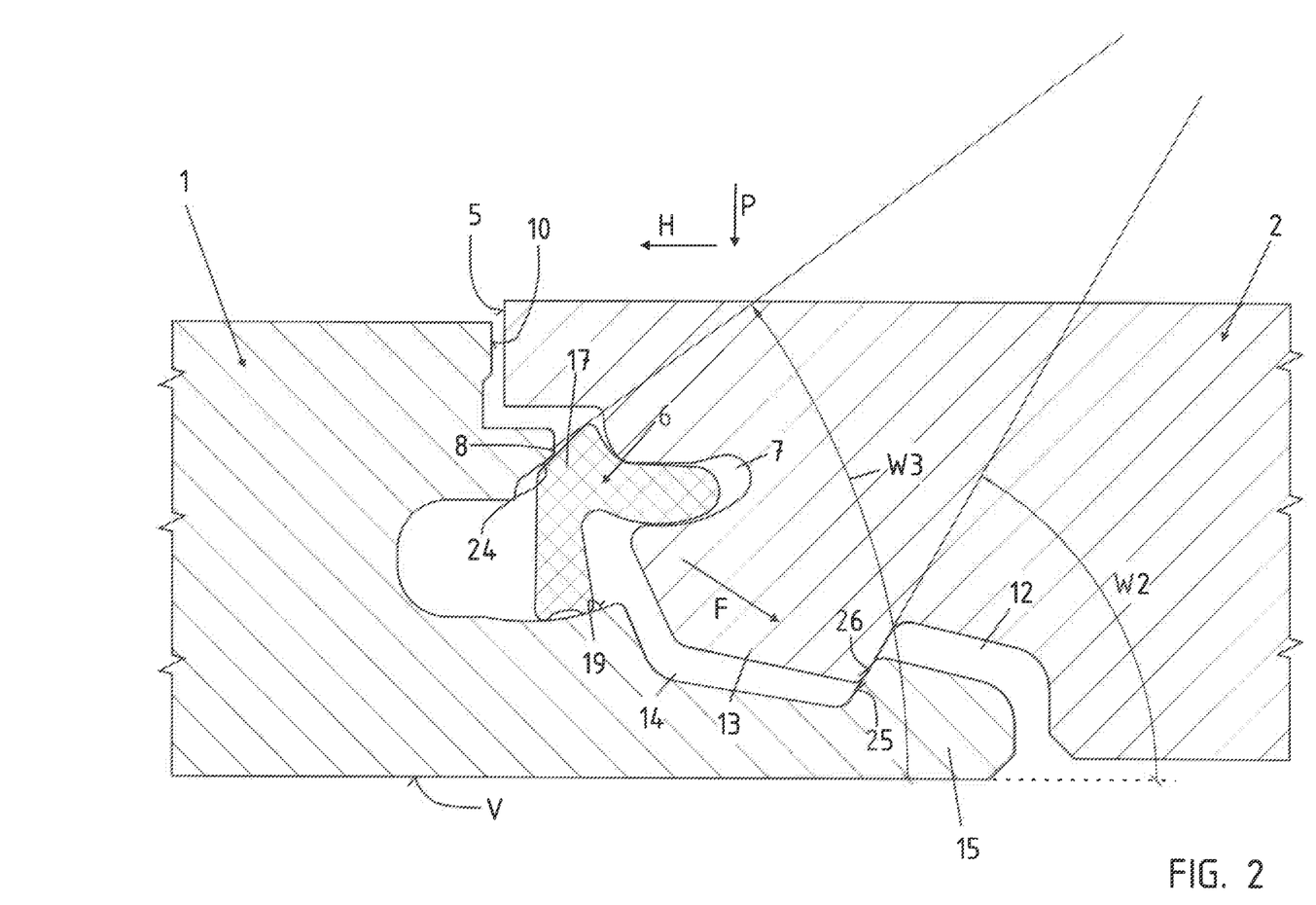
FIGS. 2 and 2a a vertical section of FIG. 1 during the connection.
Figure 2A:
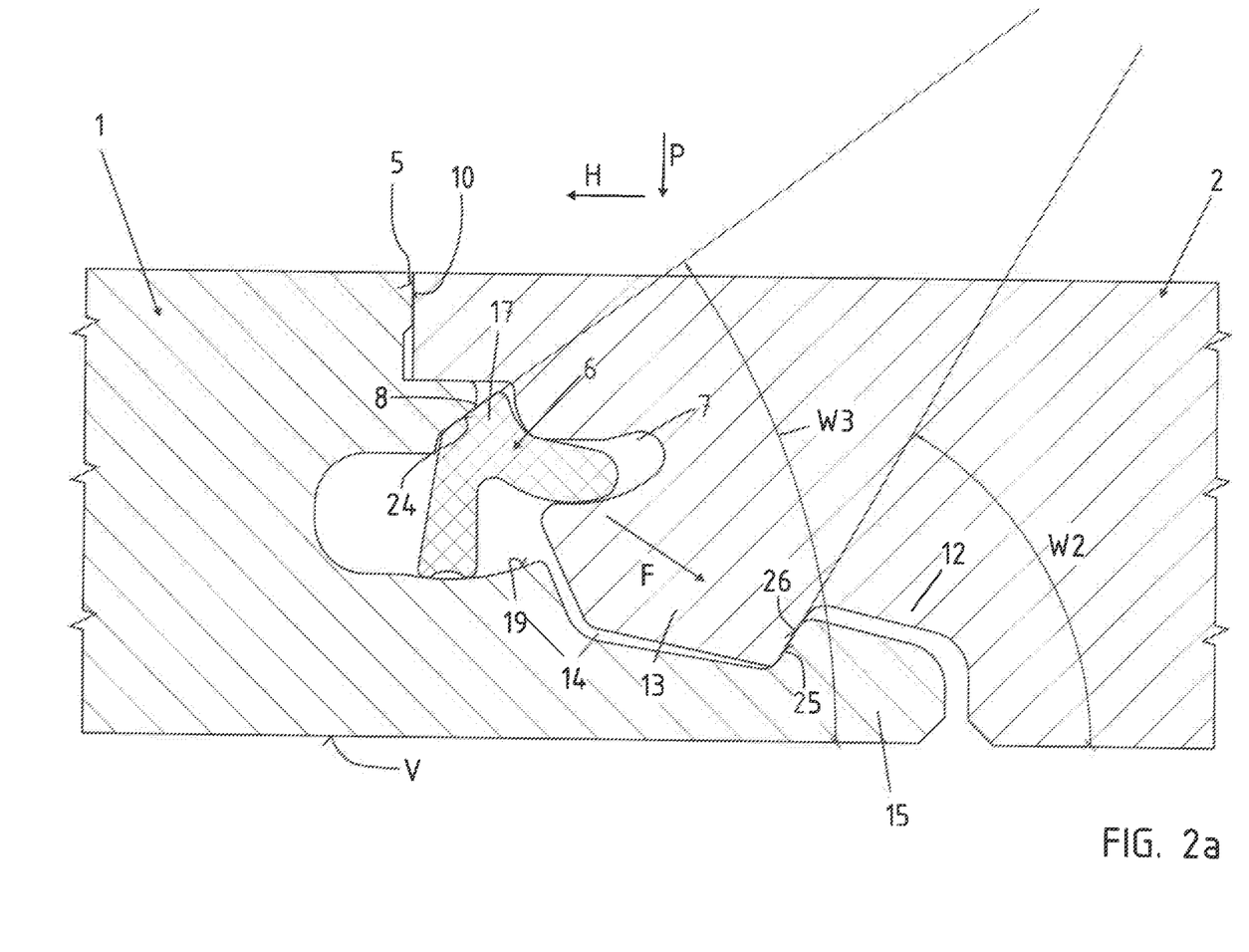
Figure 7A:
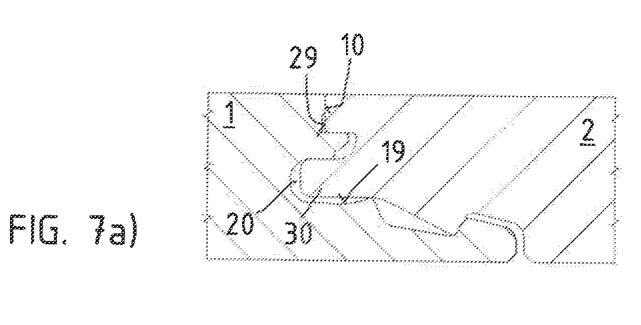
FIG. 7a a vertical section through the edge region of two mutually engaging panels according to a fourth embodiment.

The diagram of FIGS. 2 and 2a shows a possible slightly different joining movement. It has the identical components as in FIGS. 1 and 3; however, horizontal and vertical movements are superimposed in this embodiment. The second panel 2 is, on the one hand, lowered in the direction of the arrow P, i.e. vertically. On the other hand, the second panel 2 is also displaced horizontally in the direction of the arrow H, i.e. in the direction of the first panel 1, so that the edge sides 5, 10 of the panels 1, 2 abut one another. The panel 2 is shown in two different positions. The exact joining movement results from the contact between the coupling beads 15 and 13 in the transition region to their respective coupling grooves 12, 14. The angle W2 relative to the laying plane V is preferably 55 to 65°, in particular 60°. This is the flank angle in the transition between the coupling bead 13, 15 and coupling channel 12, 14 of the first and second panels 1, 2. The second depicted angle W3 denotes the angle with respect to the laying plane V, which has a locking surface 24 adjoining the locking edge 8. The locking projection 17 abuts the latching surface 24 over an area. Forces which act from above on the first panel 1 can be introduced via the latching surface 24 into the locking element 6 over an area. The locking element 6 in turn transfers these forces via the guide arm 16 to the second panel. The guide arm 16 herein essentially points toward the coupling bead 15 of the first panel 1 and hence presses the coupling bead 13 in the region of the supporting flank 25 onto the associated supporting flank 26 of the other panel. The arrow F in FIG. 7 shows the effective direction of this force.

While in the embodiment of FIGS. 1 to 3, the guide surface 19 has a slight concave curvature, but is otherwise formed without projections or depressions, the embodiment of FIGS. 4a to 4g incorporates a locking element 6, which is provided for engaging in a latching recess 27 on the first panel 1. FIGS. 4a to g, like FIGS. 3a to g for the first embodiment, show the sequence of movements. As can be seen, a projection 28 which initially slides over the guide surface 19 is formed on the bottom side of the leg 18. The guide surface 19 is not concave in this embodiment, but is merely slightly inclined for defining the direction relative to the laying plane V. When the locking element 6 is far enough swung out, the projection 28 engages in the latching recess 27 in the region of the lower groove flank of the groove 20. This locks the mechanical connection vertically. As a result, the locking element 6 should rest firmly against the first panel 1 in the region of the latching surface 24, even after the projection 28 snaps into the latching recess 27, so that the panels 1, 2 are securely connected to one another.

Both embodiments according to FIG. 3 and FIG. 4 cause the guide arm 16 to be pulled out of the guide groove 7. The movement is unidirectional in each case, i.e. is directed only away from the second panel 2 towards the first panel 1. These two exemplary embodiments represent a pure rotation about a fixed pivot point S, which is located spatially inside the second panel 2.

Figure 5B:
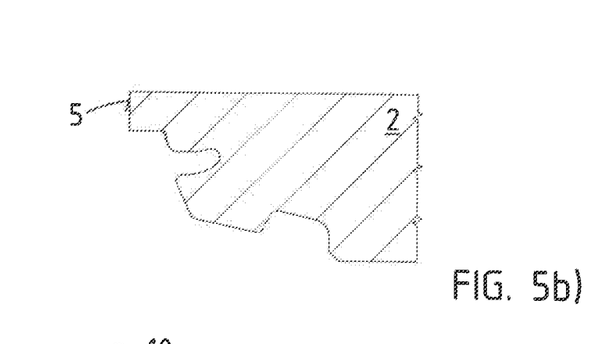
FIG. 5b a vertical section through the edge region of the second panel according to FIGS. 1 to 4.

FIGS. 5a and 5b show in the comparison once the longitudinal side of the panel 2 (FIG. 5a) and the aforedescribed edge side 5 of the panel 2.

Figure 6A:
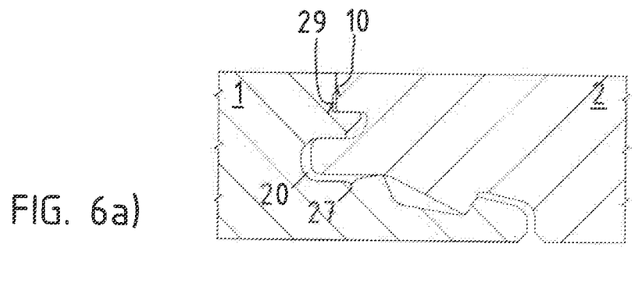
Figure 6B:
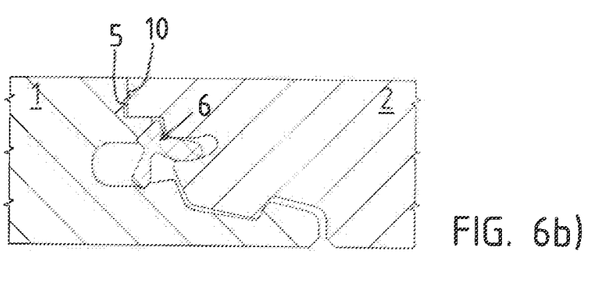

FIG. 6a shows the longitudinal edge side 29 of the panel 2, wherein a stationary spring tongue 30 is arranged on this edge side 29. The spring tongue 30 is constructed to match the groove 20 on the first panel 1. FIGS. 6a and 6b show the assembled position. FIG. 6b corresponds to the diagram of FIG. 4g. It shows the mechanical connection between the panels 1, 2, preferably in the region of their head-side edge sides. FIG. 6a shows for exactly the same first panel 1 the connection of a longitudinal edge side 29 with a edge side 10 of the first panel 1.

Figure 7B:
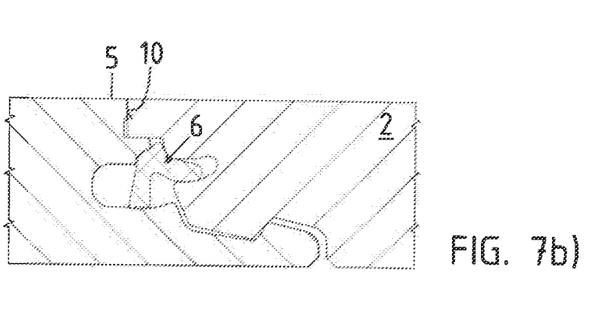

The same situation arises even when no locking recess 27 is arranged adjacent to the groove 20 below the locking edge 8, as in the embodiment of FIGS. 6a and 6b. FIGS. 7a and 7b show this situation, with the difference that the guide face 19 in the first panel 1 has only a concave curvature, which has no influence on the engagement of the stationary spring tongue 30 in the groove 20. FIG. 7b corresponds to the diagram of FIG. 3g and shows only the connection of the edge sides of the sides 5, 10 of the panels 1, 2, in contrast to the connection of the edge sides 10, 29 in FIG. 5a.

Figure 8:
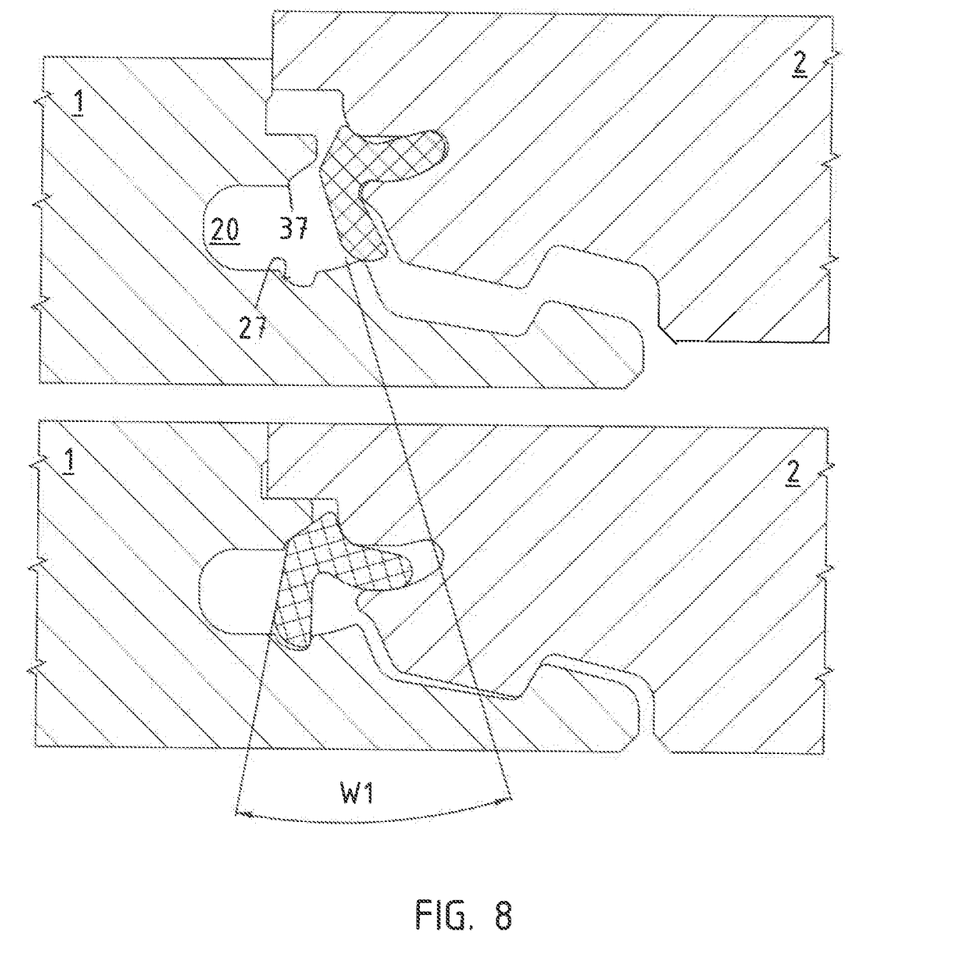
FIG. 8 a vertical section through the edge region of two mutually engaging panels in two different positions of the locking element (angle W1)

FIG. 8 shows a vertical section through the edge region of two mutually engaging panels 1, 2 in two different positions of the locking element 6, to illustrate the angle W1 by which the locking element 6 has to pivot for locking. The angle W1 is measured on a side facing away from the guide arm 16 and a side facing the groove 20 and is 20 to 35°. In this example between 25 and 30°. The design of the locking recess 27 and a projection 37 in the transition from the groove 20 to the locking surface 24 prevent the leg 18 from being further displaced in the direction of the groove 21, as shown at the bottom of FIG. 8.

Figure 9:
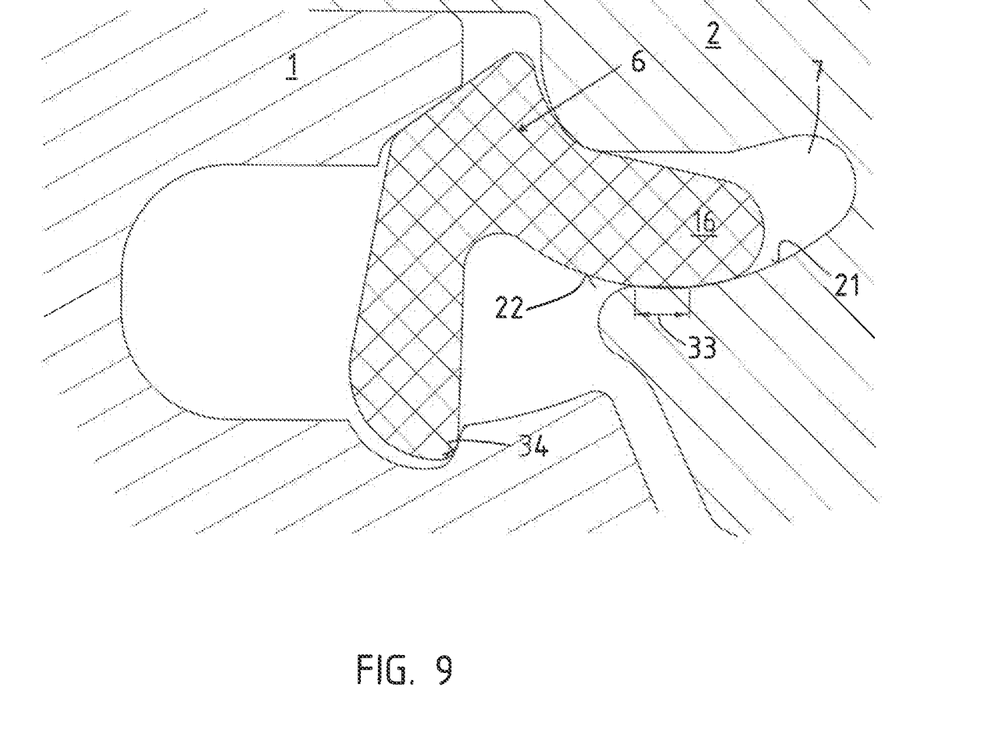
FIG. 9 a vertical section through the edge region of two mutually engaging panels according to a fifth embodiment.

FIG. 9 shows that the lower groove flank 21 has a flat region 33. This flat region 33 is located where the guide arm makes contact in the locking position. In this embodiment, the flat region 33 runs parallel to the laying plane V. As a result, a force which originates from the guide arm 16 acts exclusively perpendicular to the laying plane V and presses the second panel 2 downwards against the first panel 1.

Figure 10:
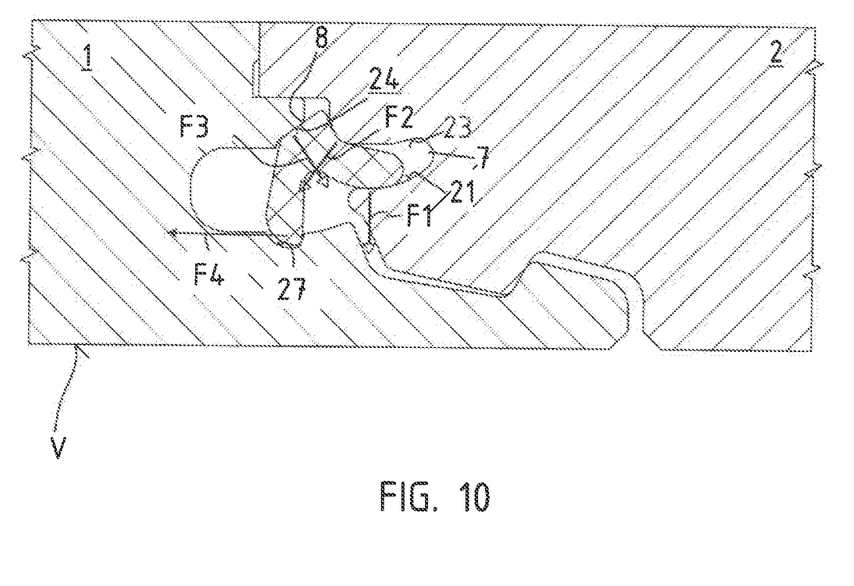
FIG. 10 the edge region according to FIG. 8 with indicated force vectors.

FIG. 10 shows the corresponding force vectors. The arrow F1 shows the direction of the force that originates from the guide arm 16 and presses onto the lower groove flank 21 of the guide groove 7. The arrow F2 shows the direction of the force acting on the locking element 6 from the second panel 2, specifically in the area of the groove mouth of the upper groove flank 23. The force is directed in the direction of the leg 18. The arrow F3 shows the direction of the force exerted by the first panel 1 on the locking element 6, specifically perpendicular to the locking surface 24 below the locking edge 8. This force presses the guide arm 16 against the lower groove flank 21 of the guide groove. The arrow F4 indicates that a force or force component acting substantially parallel to laying plane V acts on the leg 18 in the region of the locking recess 27. This produces a torque on the guide arm 16, which in turn presses the second panel 2 downward against the first panel 1 (arrow F1). For this purpose, the latching recess 27 has on its side facing the locking strip 11 a support wall 34 (FIG. 8) which encloses with the laying plane V an angle between 45° and 90°, i.e. is relatively steep and therefore enables secure locking of the locking element 6.

Figure 11:
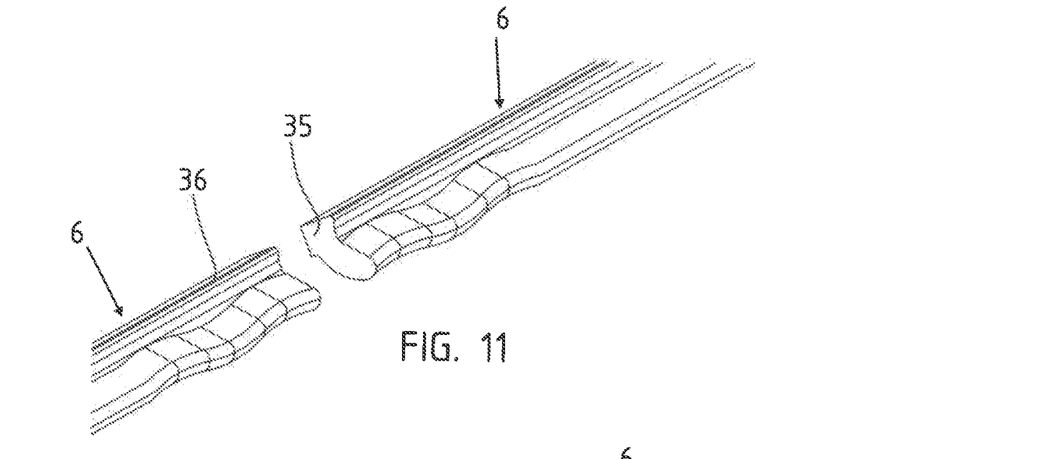
FIG. 11 ends of locking elements in a perspective view looking towards the guide arm.
Figure 12:
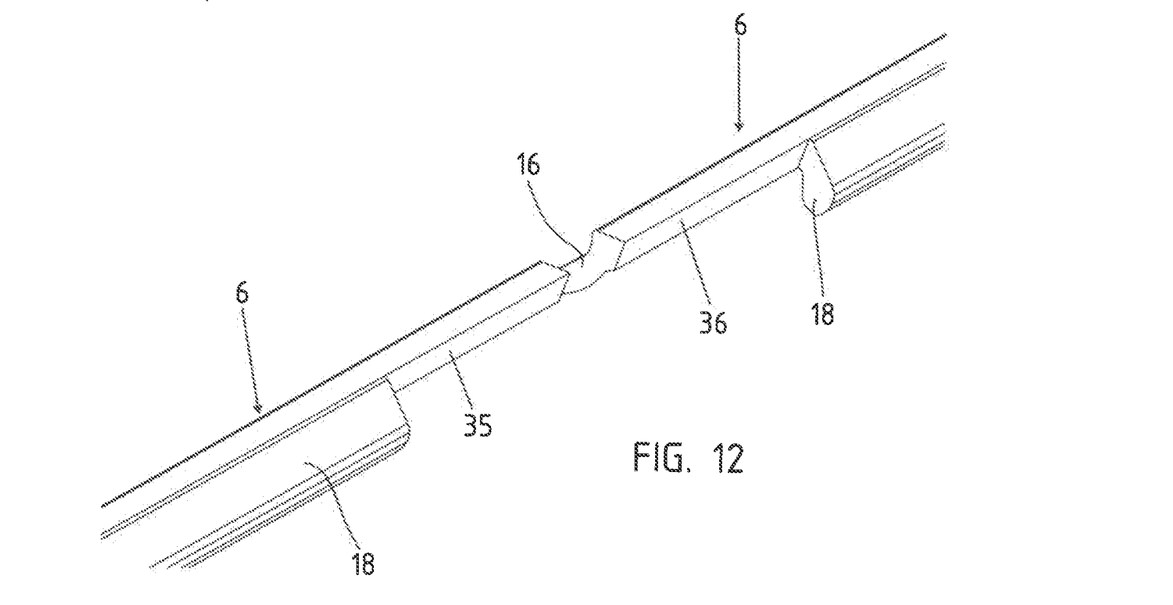
FIG. 12 the locking elements of FIG. 10 in a perspective view looking towards the leg.
Figure 13:
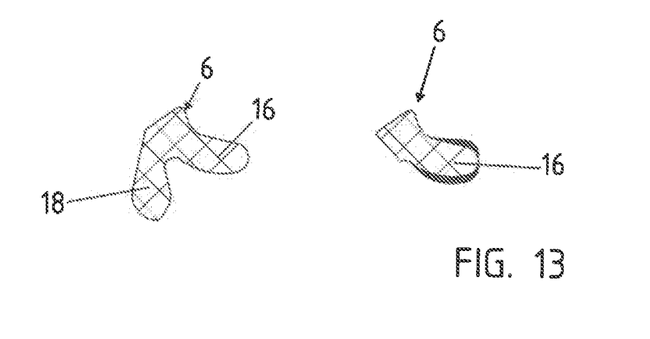
FIG. 13 a cross-section of the locking element of FIGS. 10 and 11 before and after embossing.

FIGS. 11 and 12 show ends 35, 36 of adjacent locking elements 6, with the leg 18 having been removed, in order to deform the guide arms 16 in these areas by embossing. In this example, the ends 35, 36 are corrugated in the region of the guide arms 16. FIG. 13 shows on the left a cross-section through the locking element 16 outside the end region 35 and on the right the cross-section inside the end region 35. The corrugation causes the guide arms 15 to be thicker in the end regions 35, 36. As a result, the locking element 16 can be fixed in a guide groove 6 by clamping. The manufacture is inexpensive and can be carried out while cutting profile provided in particular as endless strand.

The invention claimed is:

1. A connection for joining edge sides of adjacent first and second panels by a substantially vertical joining movement to lock the first and second panels in horizontal and vertical directions, with one of the first and second panels having a locking edge for vertical locking, said connection comprising:
    a support strip formed as a projection on an edge side of the one of the first and second panels;
    a locking element located below the support strip and arranged on the other one of the first and second panels, said locking element configured for displacement with respect to the first and second panels behind the locking edge by a pivoting movement and including a locking projection for displacement behind the locking edge and an arcuate guide arm which is guided in a guide groove of the other one of the first and second panels and is constructed to be partially pulled out of the guide groove with a rotary or pivotal movement of the locking element such that a leg of the locking element protruding from the guide groove comes into contact during placement with the one of the first and second panels in a region below the locking edge; and
    a locking strip provided on the one of the first and second panels, with the other one of the first and second panels resting in a locking position on the support strip between a top side and the locking strip of the one of the first and second panels, said locking strip sized to protrude furthest from the edge side of the one of the first and second panels and to engage below the other one of the first and second panels to be subsequently laid for horizontal locking,
    said first and second panels including upward and downward facing coupling channels and coupling beads for mutual engagement for horizontal locking;
    wherein the guide groove has a lower groove flank which has at least one section with a concave curvature and the guide arm has a bottom side which faces a bottom side of the first and second panels and has at least one section with a convex curvature that corresponds to the concave curvature of the lower groove flank.

2. The connection of claim 1, wherein the leg is rigidly connected to the arcuate guide arm.

3. The connection of claim 1, wherein the guide groove has at least one section with an arcuate curvature.

4. The connection of claim 1, wherein the leg engages in the locking position in a latching recess on the one of the first and second panels.

5. The connection of claim 1, wherein the one of the first and second panels has a locking surface which is inclined with respect to a laying plane and arranged adjacent to the locking edge for engagement with the locking projection.

6. The connection of claim 1, wherein the guide arm has a free end which is constructed such that the bottom side of the guide arm is pressed remote from a groove mouth of the guide groove against the lower groove flank of the guide groove in the locking position in order to lock the first and second panels vertically against each other.

7. The connection of claim 1, wherein the other one of the first and second panels is held on to the one of the first and second panels by pressure exerted by the locking element against the one of the first and second panels from below.

8. The connection of claim 1, wherein a locking movement of the locking element between an initial position and a locking position is unidirectional and is directed exclusively from the other one of the first and second panels towards the one of the first and second panels.

9. The connection of claim 1, wherein the locking element is produced by a machining process.

* * * * *